(12) United States Patent　(10) Patent No.: US 6,207,244 B1
Hesch　(45) Date of Patent: Mar. 27, 2001

(54) STRUCTURAL ELEMENT AND PROCESS FOR ITS PRODUCTION

(75) Inventor: Rolf Hesch, Lemgo (DE)

(73) Assignee: Moeller Plast GmbH, Bielefeld (DE)

( * ) Notice: Subject to any disclaimer, the term of this patent is extended or adjusted under 35 U.S.C. 154(b) by 0 days.

(21) Appl. No.: 09/150,707

(22) Filed: Sep. 10, 1998

Related U.S. Application Data

(63) Continuation of application No. PCT/DE97/01239, filed on Aug. 13, 1996.

(30) Foreign Application Priority Data

Aug. 13, 1996 (DE) .............................................. 196 32 550

(51) Int. Cl.[7] .............................. B60J 5/04; B60R 21/04
(52) U.S. Cl. ..................... 428/35.9; 280/751; 296/189; 296/901; 428/36.2; 428/36.4; 428/36.5; 428/45; 428/71; 428/159; 428/188; 428/317.1; 428/317.5; 428/317.9
(58) Field of Search .............................. 280/751; 296/189, 296/901; 428/35.7, 35.9, 36.1, 36.2, 36.4, 36.5, 44, 45, 71, 159, 188, 304.4, 317.9, 317.1, 317.5

(56) References Cited

U.S. PATENT DOCUMENTS

| | | | |
|---|---|---|---|
| 4,648,921 | * | 3/1987 | Nutter, Jr. .............................. 156/77 |
| 5,395,135 | * | 3/1995 | Lim et al. ............................. 280/751 |
| 5,837,172 | * | 11/1998 | Pritchard et al. .................... 264/46.4 |

* cited by examiner

Primary Examiner—Blaine Copenheaver
(74) Attorney, Agent, or Firm—Herbert L. lerner; Laurence A. Greenberg; Werner H. Stemer

(57) ABSTRACT

A wall or structural element, preferably for the body or parts of the body of motor vehicles, is formed for dissipating impact forces and introducing them into the load-bearing parts of the body of the motor vehicle. The wall or structural element is a composite element formed of a thin-section wall part and a molding which is bonded to the latter over its full surface area. The molding being composed of reinforcing elements fixed in a foamed binder. The reinforcing elements are derived from renewable raw materials in cut or uncut form, preferably monocotyledons or dicotyledons. Two or more composite elements, in each case having wall parts and moldings, may be bonded to one another to form a joint component, for example a motor vehicle door.

28 Claims, 4 Drawing Sheets

STRUCTURAL ELEMENT AND PROCESS FOR ITS PRODUCTION

CROSS-REFERENCE TO RELATED APPLICATION

This application is a continuation of International Application Ser. No. PCT/DE97/01239, filed Aug. 13, 1996, which designated the United States.

BACKGROUND OF THE INVENTION

Field of the Invention

The invention relates to a wall or structural element, in particular for the body or parts of the body of a motor vehicle. The wall or structural element provides superior impact protection and increases the resistance to pressure and bending, and improves heat-insulation. The invention also relates to a process for producing such a wall or structural element.

In the construction of motor vehicles for passenger transportation, occupant protection is becoming an increasingly important consideration. For example, the problem of side impact protection is solved by the installation of transverse members in the doors. As known, shock absorbers made of foam are also fitted into the cavities of the doors in order to distribute the forces occurring during impact and absorb impact energy by deforming. Side airbags are other known measures for the protection of vehicle occupants. However, the known configurations contribute only to a limited extent to the strength and rigidity of the body and consequently to the safety of the occupants.

A further problem of modern vehicle construction is that of heat insulation. More and more vehicles are being fitted with air-conditioning systems. At the same time, inadequate heat insulation results in wasted cooling energy on a large scale. Better heat insulation could make a considerable contribution to lowering energy consumption by reduced heating power in the winter and lower fan power in the summer.

SUMMARY OF THE INVENTION

It is accordingly an object of the invention to provide a wall or structural element and process for its production which overcome the above-mentioned disadvantages of the prior art devices and methods of this general type, and which provides a wall or structural element, preferably for the body or parts of the body of a motor vehicle, which offers the vehicle occupants a high level of safety during accidents and, by improved heat insulation, lowers energy consumption and improves traveling comfort.

With the foregoing and other objects in view there is provided, in accordance with the invention, a structural element for providing impact protection, increasing resistance to pressure and bending, and increasing heat-insulation, including a composite element having a sheet-like, thin-section wall part with a surface area; and a molding formed with a binder embedded with reinforcing elements and having a surface area adjoining the surface area of the sheet-like, thin section wall part, the composite element provided for dissipating impact forces and introducing the impact forces into load-bearing parts of a body.

The composite element formed in this way, which can be used variously as a wall element for the body or as a component for bumpers, members or the like, but also in other regions as a wall part or component of high flexural rigidity and heat insulation. The composite element can be produced at low cost and with little expenditure on primary raw materials. When used as a body wall element, it offers outstanding occupant protection during accidents, since the body or other components do not splinter and no sharp or broken edges causing injuries are produced. Any impact energy which is absorbed by the wall or structural element, such as doors, members, body panels, bumpers and the like, is dissipated and distributed over the surface area.

The expenditure on material for the body panel, in this case used as a sheet-like, thin-section wall part, is inexpensive. As a result, the vehicle weight can usually be reduced and consequently the energy consumption and ultimately the emission of pollutants can also be reduced. The climatic conditions in vehicles or other interior spaces provided with the wall element according to the invention can be improved considerably without having to use sophisticated air-conditioning systems.

In accordance with an added feature of the invention, the molding is either adhesively bonded over its entire surface area to the wall part or foamed onto the wall part.

In accordance with an additional feature of the invention, the reinforcing elements are renewable raw materials.

In accordance with another feature of the invention, the renewable raw materials are disposed in the binder as uncut, partially cut, and/or substantially cut in a form of stalks, stalk sections, fibers, bundles of fibers, twisted yarns, filaments, husks, nonwovens, wovens or rovings.

In accordance with another added feature of the invention, the renewable raw materials are dicotyledons, including flax, hemp, jute, and linume, and/or monocotyledons, including bamboo and giant grasses.

In accordance with another additional feature of the invention, the binder is a foamable synthetic, a biological derived substance, a naturally derived substance, matrices of natural substances or matrices of synthetic substances.

In accordance with yet another added feature of the invention, there are low weight recycled cores provided in regions of low tensile and compressive stress inside of the molding.

In accordance with yet another feature of the invention, the recycled cores are unreinforced recycled products, formed from foam, foam granules, preformed parts, prebonded parts, foam-textile combinations or textiles.

Inside the molding or in regions of low tensile and compressive stress, recycled cores of unreinforced or reinforced recycled products, such as foam, foam granules or preformed or prebonded parts of the latter, foam-textile combinations, textiles or natural foams, for example sunflower pith, may be provided.

In accordance with yet another additional feature of the invention, there is an insulating layer disposed between the molding and the thin-section wall part, the insulating layer is recycled foam and is adhesively bonded solidly to each of the molding and the thin-section wall part.

In accordance with yet a further added feature of the invention, the insulating layer includes a molded foam part, a foam panel or foam flakes.

In accordance with yet a further additional feature of the invention, a foamable material is admixed with the recycled foam forming the insulating layer for adhesively bonding the insulating layer with the thin-section wall part.

In accordance with yet another further feature of the invention, the molding is at least two moldings produced separately and bonded to one another in a sandwich type of construction.

In accordance with a further feature of the invention, each of the at least two moldings has a shell with a cavity formed therein, and the cavity receives an insulating core.

In accordance with an added feature of the invention, the insulating core is formed with the binder and the reinforcing elements.

In accordance with another feature of the invention, the insulating core includes recycled products without reinforcing elements.

In accordance with an additional feature of the invention, the insulating core has regions for receiving functional elements, actuating elements and cables.

In accordance with a further added feature of the invention, the molding is constructed at least partially from a number of shells in the sandwich type of construction for easy accessibility to and exchangeability of functional and actuating elements. Between the moldings there may be provided an insulating core composed of a binder and reinforcing means or composed of recycled products, it also being possible for clearances to be formed in the insulating core for receiving actuating elements, cables or the like.

In accordance with a further additional feature of the invention, the thin-section wall part is formed with sheet metal or a thin-layer, sheet-like decorative material.

In accordance with yet another added feature of the invention, the wall part is formed with sheet metal for forming a sheet-metal skin, and includes a hard shell formed by compression molding or injection molding adjoined to and reinforcing the sheet-metal skin, the hard shell also adjoining and solidly bonding to the molding.

In accordance with yet another feature of the invention, the hard shell includes the reinforcing elements for providing high tensile stress strength.

In accordance with yet another additional feature of the invention, the molding is adjoined on two sides by the hard shell. Between the thin-section wall part and the molding there is arranged a hard shell formed by compression molding or injection molding and solidly bonded to both of them. The molding may be covered on the side opposite the wall part by a solidly bonded second hard shell, as a counter-chord. Cross-pieces extending in the transverse direction may also be molded onto the first hard shell, the cavities formed as a result are filled in the way described above with reinforcing elements or recycled products, or both, surrounded by binder.

In accordance with an added feature of the invention, the hard shell covered molding includes at least one recycled core.

In accordance with another feature of the invention, there are transverse cross-pieces extending in a transverse direction which are molded onto the hard shell adjoining the wall part.

In accordance with an additional feature of the invention, the hard shell provided with the transverse cross-pieces is formed from a plurality of half-shells which are solidly bonded to the wall part and to one another.

In accordance with a further added feature of the invention, the half-shells have cavities formed therein, the cavities of the half-shells are filled with one of the reinforcing elements and the binder, unreinforced recycled material, and the reinforcing elements and the binder with a recycled core.

In accordance with a further feature of the invention, the composite element is one of a body part or parts of the body of a motor vehicle.

With the foregoing and other objects in view there is also provided, in accordance with the invention, a process for producing a composite structural element, which includes providing a thin-section wall part; placing the thin-section wall part into a mold; applying reinforcing elements to the thin-section wall part; placing a counter-mold onto the mold for forming a mold cavity; introducing a binder having a foaming agent into the mold cavity via one of injection cannulas and nozzles, after a set time delay a foaming of the binder occurring for encapsulating the reinforcing elements on all sides.

According to the process of the invention for producing the structural element as a composite work piece, reinforcing elements, preferably in the form of renewable raw materials or parts thereof, are applied to the thin-section wall element, preferably consisting of sheet metal, and, after the placing on of a counter-mold, the binder with a delayed-action or immediately acting foaming agent are introduced into the cavity thus formed via injection cannulas or nozzles. The binder initially flows around the reinforcing elements, in order to create during the subsequent foaming a solid bond between the wall part and the foamed binder and between the reinforcing elements and the foamed binder and at the same time to fix the reinforcing elements in position. To improve the adhesion between the wall part and the molding formed of the binder and reinforcing elements, the side of the wall part facing the molding may be primed in advance.

Before providing the reinforcing elements, the thin-section wall part may be backed with a hard shell by compression molding or injection molding, a second hard shell being applied as a counter-chord once the molding has formed.

The first hard shell-provided with transverse cross-pieces may be produced separately and also in more than one part and then be adhesively bonded on the wall part in an already prefabricated form. A plurality of hard shells with transverse cross-pieces also being held in positive engagement with respect to one another and on the wall part may also form one complete hard shell.

In accordance with an added feature of the invention, there is the further step of introducing the binder having the foaming agent into an open mold.

In accordance with another feature of the invention, there is the further step of using the binder with the foaming agent having a set time delay of less than 5 seconds for foaming the binder.

In accordance with an additional feature of the invention, there is the step of priming the thin-section wall part on a foam application side to improve adhesion before applying the binder.

In accordance with yet another added feature of the invention, there is the step of backing the thin-section wall part with a hard shell formed with reinforcing elements by compression molding or injection molding before a formation of the mold cavity, and applying a second hard shell subsequently to the free side of the molding.

In accordance with yet another further feature of the invention, there is the step of molding on transverse cross-pieces to the hard shell during the application of the hard shell.

In accordance with yet a further feature of the invention, there is the step of forming a recycled core from one of a foam or a comparable light weight material and placing the recycled core in the reinforcing elements before the binder is injected.

With the foregoing and other objects in view there is further provided, in accordance with the invention, a process for producing a composite structural element, which includes: producing moldings formed with reinforcing elements and a binder by foaming of the binder for encapsulating the reinforcing elements; producing hard shells formed with the reinforcing elements and the binder by foaming of the binder for encapsulating the reinforcing elements; and providing a thin-section wall part, and bonding adhesively the moldings and the hard shells to the thin-section wall part for forming a composite element. The moldings themselves may also be produced separately from the thin-section wall part, to be precise with or without recycled cores, and then be adhesively bonded to the wall part or to the hard shell.

In accordance with an added feature of the invention, there is the step of producing the moldings with recycled cores.

In accordance with a concomitant feature of the invention, there is the step of producing the hard shells with transverse cross-pieces.

Other features which are considered as characteristic for the invention are set forth in the appended claims.

Although the invention is illustrated and described herein as embodied in a wall or structural element and process for its production, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
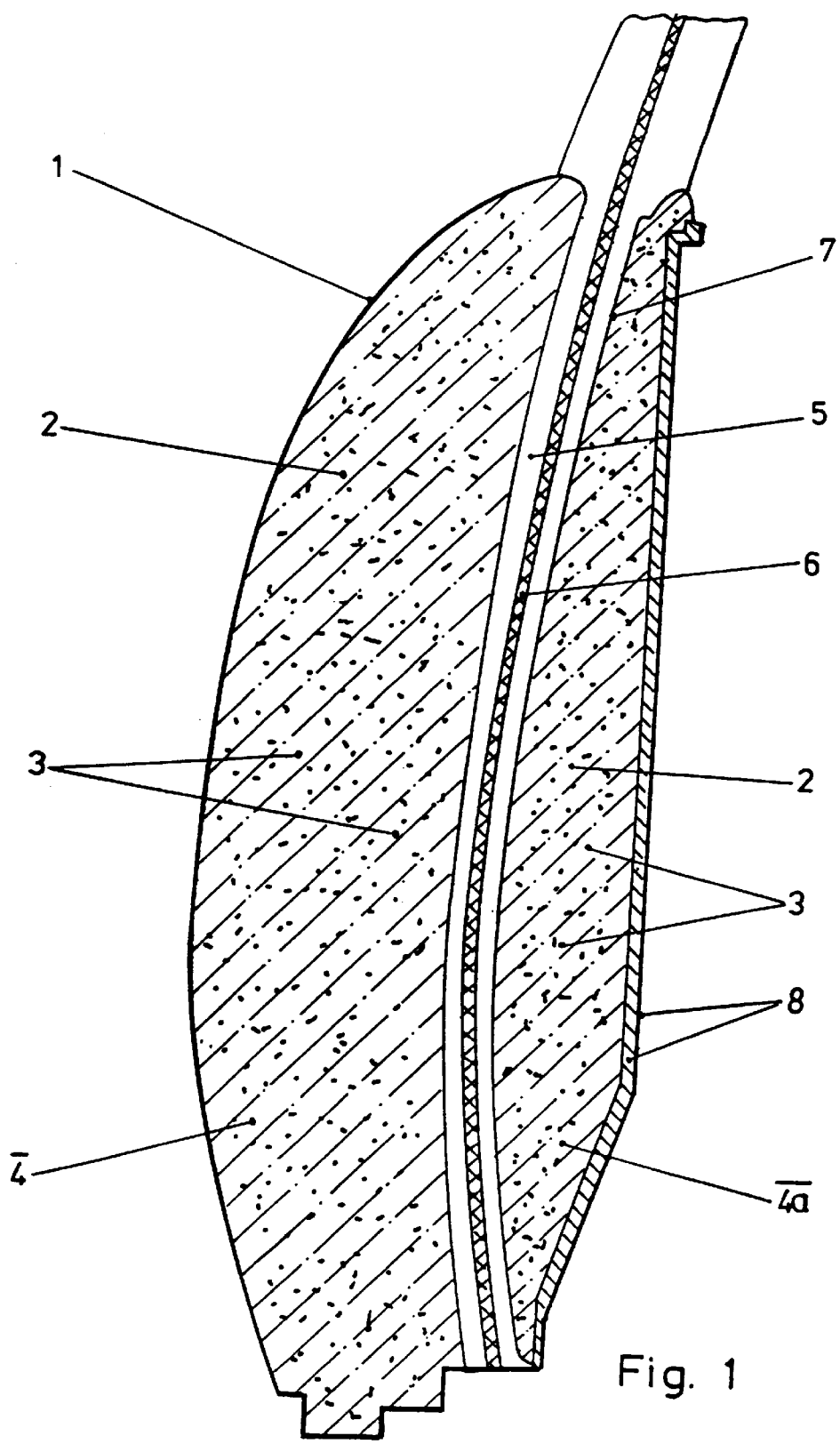
FIG. 1 is a sectional view of a wall or structural element of a composite type of construction bonded to a further composite component, taking as an example a vehicle door of a motor vehicle according to the invention.

Referring now to the figures of the drawing in detail and first, particularly, to FIG. 1 thereof, there is shown a wall or structural element produced as a composite in the example of a door for a motor vehicle. The door includes two wall or structural elements respectively produced as a composite type of construction and secured to each other, but leaving a channel 5 free between them because of a required fitting of a window pane 6 and a mechanism required for moving it. A thin-section wall part 1 for an outer skin of the motor vehicle door is formed of sheet metal, is adjoined by a molding 4 formed of a foamed synthetic, biological or naturally derived binder 2 and reinforcing elements 3 surrounding the latter and thereby fixed in their position. The molding 4 is bonded to a second molding 4a, or composite part, forming an interior paneling of the vehicle door. Provided between the two moldings 4, 4a is the channel 5 for receiving the window pane 6, a guide rail 7 required for guiding the window pane 6, and further actuating elements (not shown in the drawing) for moving the window pane 6. The outside of the second molding 4a is covered by a decorative layer 8 shown as a thin-layered wall part and is solidly bonded to the molding 4a by foaming on, adhesion or the like.

The production of the wall or structural element shown in FIG. 1 takes place by placing the wall part 1, serving as the outer door skin formed of sheet metal, into a mold and covering its inner side uniformly with a layer of the reinforcing element 3. Renewable raw materials in the form of stalks and stalk sections or fibers and bundles of fibers as well as nonwovens and the like produced from the latter are used as the reinforcing elements 3. Preferably considered here as renewable raw materials are monocotyledons and dicotyledons, which are distinguished by outstanding mechanical properties. In the case of dicotyledons, the periphery of the stalk consists of a bast ring, which is composed of extremely long and high-strength fibers, particularly in the case of bast fiber plants. The cylindrical arrangement of the bast fibers represents what is mechanically an ideal cross section for bringing about a particularly high modulus of elasticity as well as a high flexural strength and buckling resistance. Although monocotyledons do not have a pronounced bast ring, they have a ring of shorter-fibered sclerenchyma, adjoined in the case of many species by a high-strength ring of vascular bundles, which are accompanied by high-strength mechanical tissue. In addition to this, they have a highly pronounced epidermis of great toughness.

The renewable raw materials used according to the invention are also advantageous to the extent that their fibers are embedded in a parenchyma matrix. The parenchyma is resistant to pressure and has a large lumen and, in interaction with the peripheral strengthening strands, allows considerable flexing. In the case of dicotyledons, on the other hand, in the center of the stalk there is instead of the parenchyma a core of wood, which is likewise characterized by an extremely low wood density.

After applying the reinforcing elements 3 of renewable raw materials to the wall part 1, a counter-mold (not shown) is placed on and the binder 2 is introduced via corresponding cannulas or injection nozzles into the hollow mold thus formed. The binder 2 is free-flowing during injection process, with the result that it flows completely around the reinforcing elements 3 and can penetrate into all the intermediate spaces. After a time delay, the binder 2 will foam and secure the reinforcing elements 3 in place. The foaming process commences only after a certain time delay after a corresponding distribution of the binder 2. The foamed binder 2 adheres solidly to the reinforcing elements 3 and fixing the latter in its position.

Once the inner side of the wall parts 1 (door panel) has been primed, if need be, before being placed into the mold, the molding 4 including the foamed binder 2 and reinforcing elements 3 also undergoes a solidly adhering, full-area bond with the wall part 1. The result being a one-piece composite is obtained after removing the counter-mold.

In the case of the exemplary embodiment represented on the basis of a vehicle door, the second molding 4a can be separately produced in the same way as a thin-section wall part 1 onto an interior paneling or the decorative layer 8. The two composite parts subsequently being solidly bonded to each other in a sandwich-like manner with recesses forming intermediate spaces for receiving the window pane 6 and necessary guiding and actuating elements.

With composites produced in this way, which may be configured equally as a member or a wall element of the body or as a bumper etc., outstanding side impact protection in the motor vehicle is achieved by increasing the moment of resistance and the deformation path. Since impact forces are uniformly distributed and dissipated and introduced into the cage structure of the passenger compartment, the impact energy is substantially absorbed. At the same time, the heat insulation of the body is improved and consequently the $CO_2$ emission and the energy consumption are reduced. Finally, the climatic conditions in the interior of the vehicle are also improved. On account of the composite type of construction including a sheet-like wall part 1 and the reinforced molding 4 (foam element), the body panel can be made much thinner than is generally customary, with the result that expenditure on material for the body panel, which is a high consumer of primary energy, and ultimately the weight of the body can usually be lowered. In addition, in the event of impact, no sharp edges are produced, since the composite material does not splinter, and consequently the safety of the vehicle occupants and other persons involved in an accident is increased.

According to the invention, it is also possible, however, contrary to the production process described above, to produce the reinforced molding 4, 4a separately in a mold, i.e. separately from the wall part 1 (or 8), and subsequently adhesively bond it to the thin-section wall part 1. Even greater rigidity of the structural element produced as a composite part can be achieved by using integral foam, it being possible in this case to reduce further the wall thickness of the thin-section wall part 1.

Figure 2:
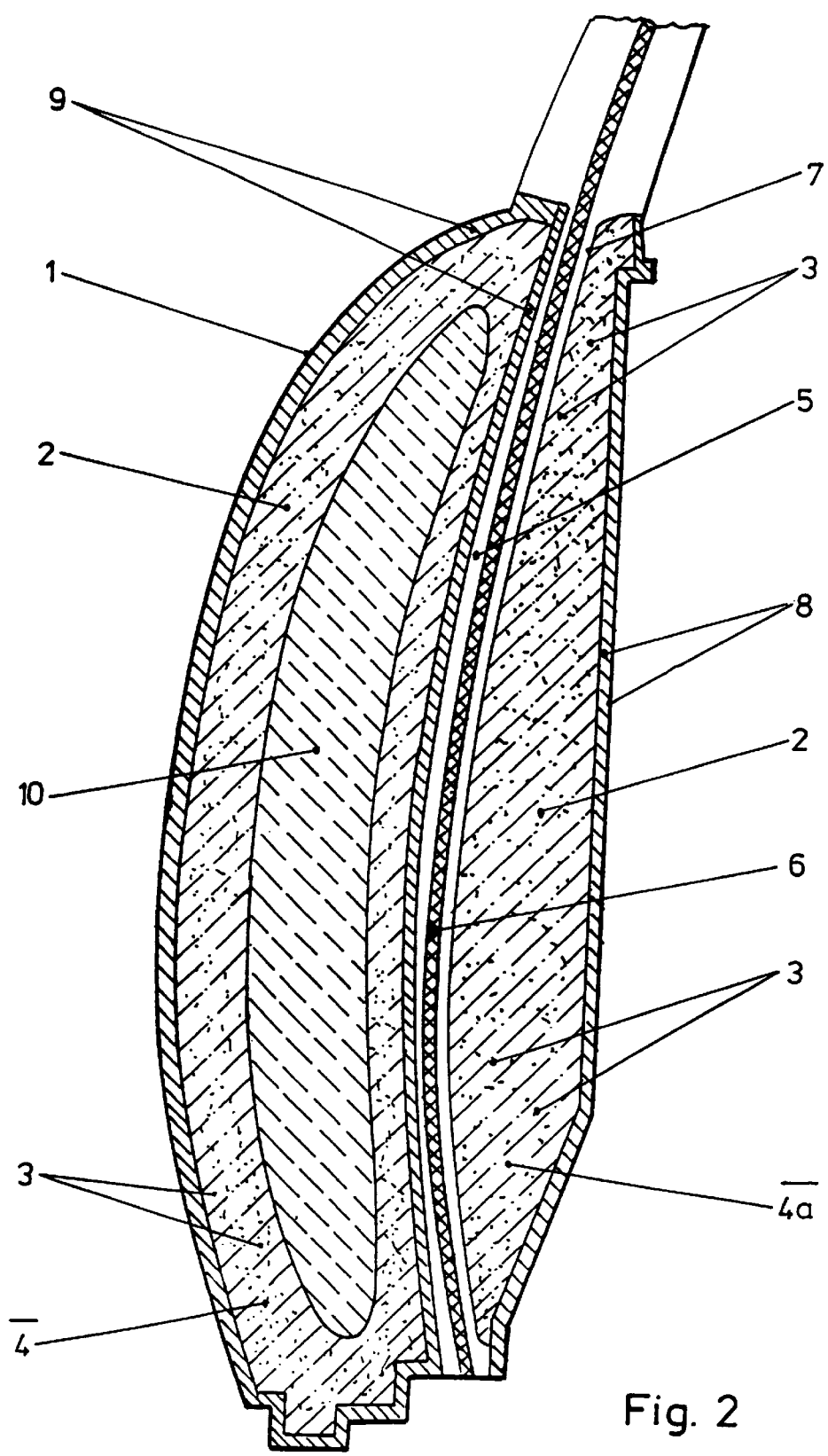
FIG. 2 is a sectional view of a second embodiment of the structural element serving as the vehicle door.

FIG. 2 shows a second variant of the invention also shown by example as the door of a motor vehicle in which the impact protection is further improved and the thickness of the wall part 1 is even further reduced.

The wall part or component differs from that represented in FIG. 1 essentially in that the thin-section wall part 1, i.e. the outer skin of the door, the body, a member etc., is backed by a hard shell or insulating layer 9 formed by compression molding or injection molding 9, preferably using reinforcing elements 3 of renewable raw materials in the hard shell 9. In the way described above, the molding 4 including the reinforced foam or integral foam and reinforcing elements 3 are applied to the hard shell 9, in a solid bond with the shell 9, and a further hard shell 9 is applied to the molding 4 as a counter-chord.

It can also be seen from FIG. 2 that, to save primary material, inside the molding 4 there is a recycled core or insulating core 10 formed of a lightweight recycled material. The size of this recycled core 10 is variable. It may ultimately reach over the entire cross section of the molding 4 and, moreover, be reinforced with renewable raw materials or other materials. It goes without saying that this molding can also be produced separately, as described with reference to FIG. 1, and then be adhesively bonded to the thin-section wall part 1, in order to form the composite in this way. In order to form the channel 5, the second molding 4a, or the second structural element, is solidly joined onto the structural element thus formed.

Figure 3:
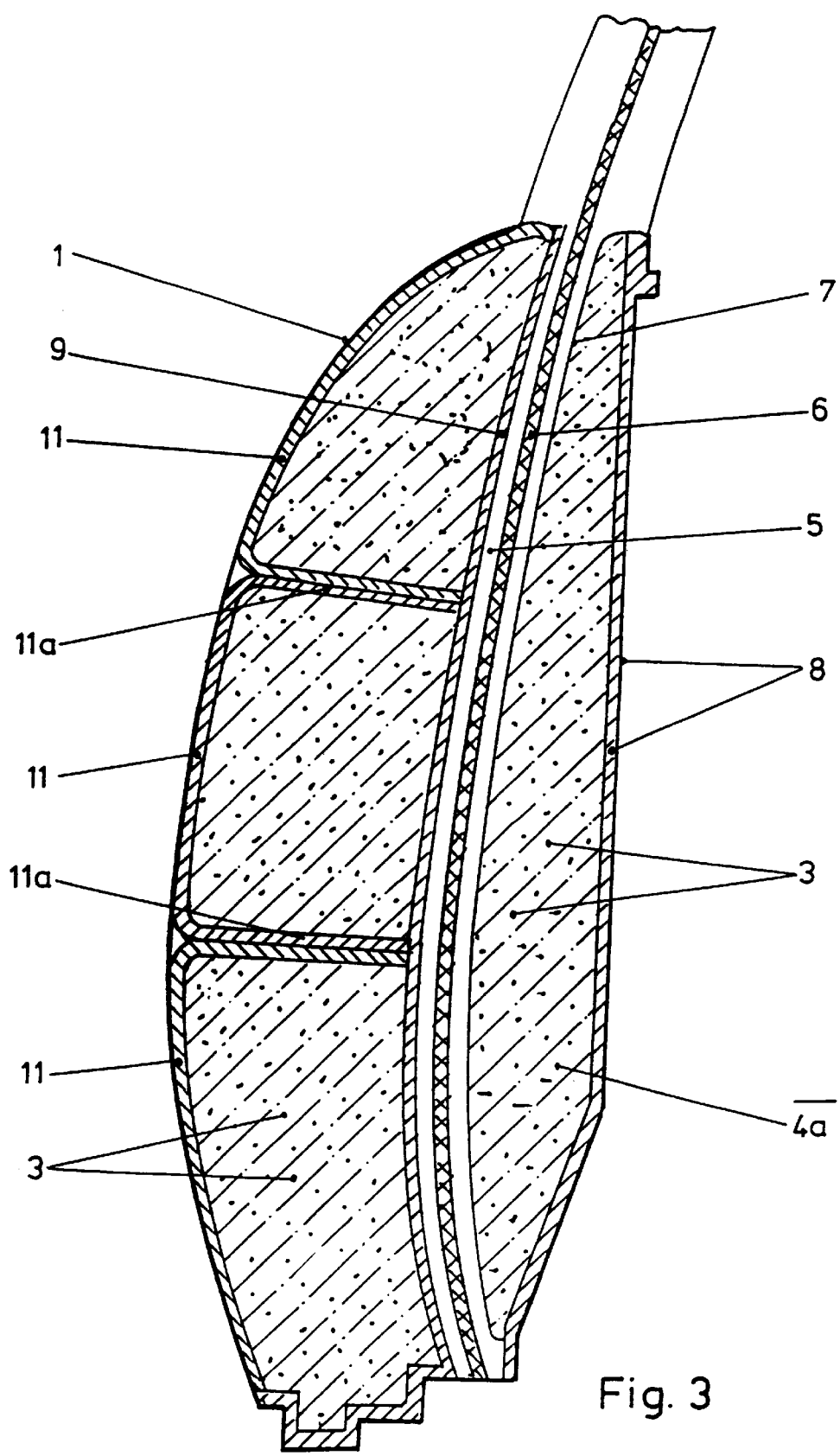
FIG. 3 is a sectional view of a third embodiment of the structural element of the composite type used as part of the vehicle door connected to a second composite component.

In FIG. 3, there is reproduced a third variant of a wall or structural element, configured as a composite, for the motor vehicle door. In this case, the wall or structural element is reinforced by transverse cross-pieces 11a, which are part of half-shells 11 produced separately and solidly bonded to the wall part 1. The half-shells 11 are placed with positive engagement into the wall part 1 and held against the latter and with respect to one another by adhesion or foaming in. The half-shells 11 with the transverse cross-pieces 11a extending substantially perpendicularly away from the latter, are produced with the preferred use of renewable raw materials as reinforcing elements 3. The cavities formed by the half-shells 11 and transverse cross-pieces 11a are filled by reinforcing elements 3 composed of renewable raw materials and foam having a binder 2, or else are provided with a recycled core or completely with a foam filling. The half-shells 11 filled in this way are covered with a hard shell 9. The hard shell 9 forms a solid bond with the half-shells 11 or the transverse cross-pieces 11a, for example by the foam-filling of the cavities. The hard shells 9 and the half-shells 11 are produced by a compression-molding technique or else an injection-molding or blow-molding technique, with or without the use of reinforcing elements 3.

With the third variant, particularly high rigidity and flexural strength can be achieved resulting in a further reduction in the material thickness of the outer skin (wall part 1).

As already described above, the composite element embodiments may be in the form of a vehicle door. There may be connected to the composite element thus produced, the second molding 4a, into which various functional elements (not shown), such as map pockets, armrests or the like, may be integrated. In this case, the thin-section inner wall part (decorative layer 8) may also be configured as a thin sheet-metal skin, in order to bring about a further increase in the rigidity of the vehicle door.

Figure 4B:
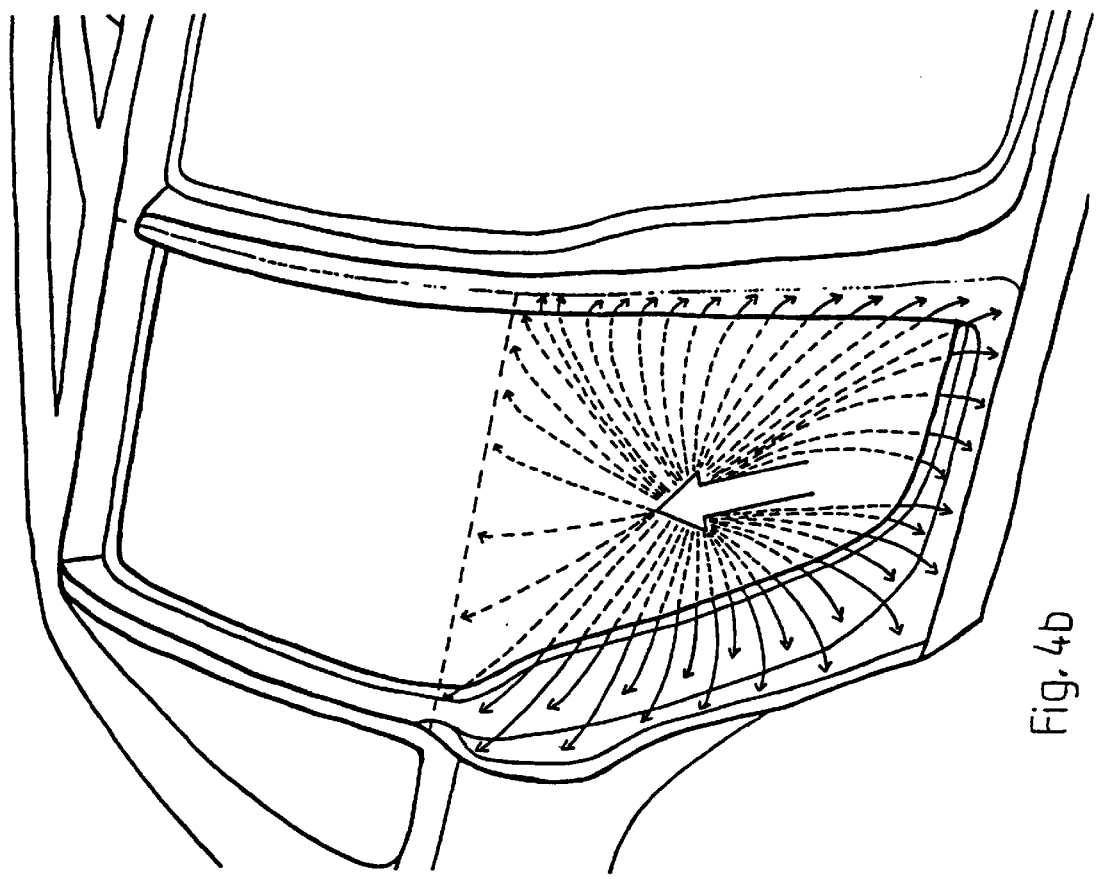
FIGS. 4a and 4b are perspective, side-elevational views of the vehicle door and of load-bearing parts of a passenger car in a region of the vehicle door, with arrows representing dissipation to all sides of forces generated during side impact onto the load-bearing parts of the vehicle door and of a body of the motor vehicle.
Figure 4A:
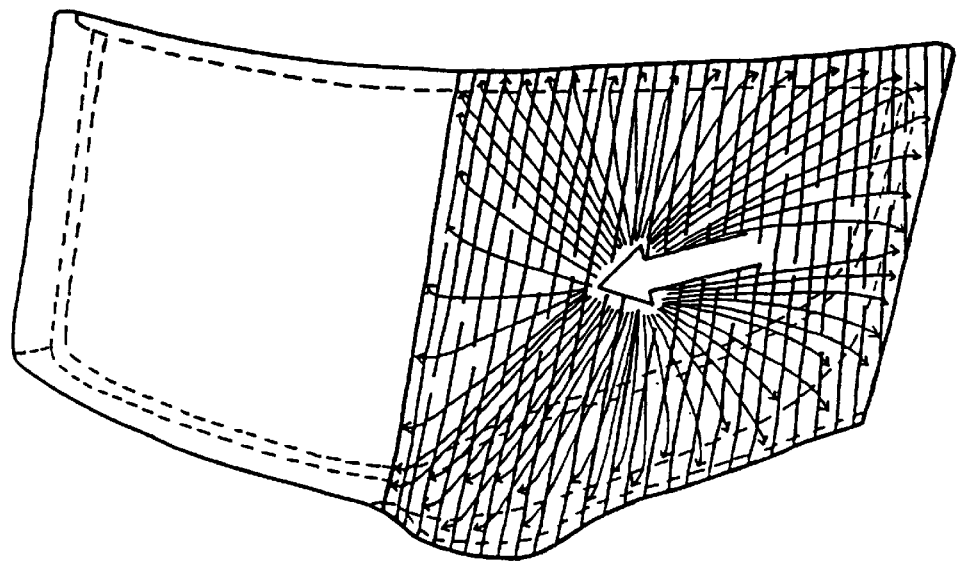

It can be seen from the representations of a passenger vehicle door, or the part of the body receiving the latter, reproduced in FIGS. 4a and 4b, how the door in the form of a rigid shell covers over the fold of the door opening over its full area—with the exception of the window region—and consequently the energy generated during impact (large arrow) is dissipated over a large area onto the entire door fold in the direction of the small arrows. In addition, in combination with the dissipation of the forces, the impact energy is absorbed by the compression of the foam core extending over the entire door surface area.

I claim:

1. A structural element for providing impact protection, increasing resistance to pressure and bending, and increasing heat-insulation, comprising:
    a composite element including:
        a thin-section wall part for forming a portion of an outer skin of an automobile body and having an internal surface; and
        a molding formed with a binder being a foam embedded with reinforcing elements made of renewable raw material and being adhesively bonded to said internal surface of said thin-section wall part, said composite element provided for dissipating impact forces and introducing the impact forces into load-bearing parts of the automobile body.

2. The structural element according to claim 1, wherein said molding is adhesively bonded over its entire surface area to said wall part.

3. The structural element according to claim 1, wherein said renewable raw materials are selected from the group consisting of stalks, stalk sections, fibers, bundles of fibers, twisted yarns, filaments, husks, nonwovens, wovens and rovings.

4. The structural element according to claim 1, wherein said renewable raw materials are selected from the group consisting of dicotyledons and monocotyledons.

5. The structural element according to claim 4, wherein said dicotyledons are selected from the group consisting of flax, hemp, jute and linume.

6. The structural element according to claim 4, wherein said monocotyledons are selected from the group consisting of bamboo and giant grasses.

7. The structural element according to claim 1, wherein said binder is selected from the group consisting of foamable synthetic, a biological derived substance, a naturally derived substance, matrices of natural substances and matrices of synthetic substances.

8. The structural element according to claim 1, including low weight recycled cores provided in regions of low tensile and compressive stress inside said molding.

9. The structural element according to claim 8, wherein said recycled cores are unreinforced recycled products, formed with cores selected from the group consisting of foam, foam granules, preformed parts, prebonded parts, foam-textile combinations and textiles.

10. The structural element according to claim 1, including an insulating layer disposed between said molding and said thin-section wall part, said insulating layer being recycled foam and being solidly glued to each of said molding and said thin-section wall part.

11. The structural element according to claim 10, wherein said insulating layer includes foam selected from the group consisting of a molded foam part, a foam panel and foam flakes.

12. The structural element according to claim 10, wherein a foamable material is admixed with said recycled foam forming said insulating layer for adhesively bonding said insulating layer with said thin-section wall part.

13. The structural element according to claim 1, wherein said molding is one of at least two moldings produced separately and bonded to one another in a sandwich construction.

14. The structural element according to claim 13, wherein each of said at least two moldings has a shell with a cavity formed therein, and including an insulating core received in said cavity.

15. The structural element according to claim 14, wherein said insulating core is formed with said binder and said reinforcing elements.

16. The structural element according to claim 14, wherein said insulating core includes recycled products without reinforcing elements.

17. The structural element according to claim 14, wherein said insulating core has regions for receiving functional elements, actuating elements and cables.

18. The structural element accoridng to claim 13, wherein said molding is constructed at least partially from a number of shells in said sandwich construction for easy accessibility to and exchangeability of functional and actuating elements.

19. The structural element according to claim 1, wherein said thin-section wall part is formed with sheet metal.

20. The structural element according to claim 1, wherein said wall part includes sheet metal for forming a sheet-metal skin, and including a hard shell formed by one of a compression molding and injection molding adjoined to and reinforcing said sheet-metal skin, said hard shell also adjoining and solidly bonding to said molding.

21. The structural element according to claim 20, wherein said hard shell includes said reinforcing elements for providing high tensile stress strength.

22. The structural element according to claim 20, wherein said molding is adjoined on two sides by said hard shell.

23. The structural element according to claim 22, wherein said hard shell covered molding includes at least one recycled core.

24. The structural element according to claim 20, including transverse cross-pieces extending in a transverse direction are molded onto said hard shell adjoining said wall part.

25. The structural element according to claim 24, wherein said hard shell provided with said transverse cross-pieces is formed from a plurality of half-shells which are solidly bonded to said wall part and to one another.

26. The structural element according to claim 25, wherein said half-shells have cavities formed therein, said cavities of said half-shells are filled with fillers selected from the group consisting of said reinforcing elements and said binder, unreinforced recycled material, and said reinforcing elements and said binder with a recycled core.

27. The structural element according to claim 1, wherein said molding is foamed onto said wall part.

28. The structural element according to claim 1, wherein said thin-section wall part is formed with a thin-layered decorative material.

* * * * *